US 6,561,544 B1

(12) United States Patent
Clancy, III et al.

(10) Patent No.: US 6,561,544 B1
(45) Date of Patent: May 13, 2003

(54) AIRBAG DEPLOYMENT SYSTEM WITH SEAT POSITION SENSORS

(75) Inventors: Ed Clancy, III, Novi, MI (US); Mohannad Murad, Troy, MI (US); Hossam Almasri, Sterling Heights, MI (US); Randy Gosk, Troy, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/161,632

(22) Filed: Jun. 5, 2002

(51) Int. Cl.$^7$ .............................................. B60R 21/32
(52) U.S. Cl. ......................................... 280/735; 701/45
(58) Field of Search ............................. 280/735, 730.1; 180/272; 701/45

(56) References Cited

U.S. PATENT DOCUMENTS

| 4,909,560 A | 3/1990 | Ginn ........................ 296/65.1 |
| 5,074,583 A | 12/1991 | Fujita et al. ................ 280/735 |
| 5,398,185 A | 3/1995 | Omura .................. 364/424.05 |
| 5,413,378 A | 5/1995 | Steffens, Jr. et al. ........ 280/735 |
| 5,893,582 A | 4/1999 | Allen et al. .................. 280/735 |
| 5,967,549 A | 10/1999 | Allen et al. .................. 280/735 |
| 6,053,529 A | 4/2000 | Frusti et al. ................. 280/735 |
| 6,095,555 A | 8/2000 | Becker et al. ............... 280/735 |
| RE37,466 E | 12/2001 | Allen et al. .................. 280/735 |
| 6,351,994 B1 | 3/2002 | Fertig et al. ............... 73/432.1 |

FOREIGN PATENT DOCUMENTS

JP          5213142          8/1993

*Primary Examiner*—Peter C. English
(74) *Attorney, Agent, or Firm*—Jarett Rieger; Lonnie Drayer

(57) ABSTRACT

A system for detecting the position of a seat within an automobile in which a selected number of discrete sensors S is used to detect (2xS) seat positions. This is accomplished by using an actuator which, when positioned over three sensors, activates three sensors and when positioned over two sensors, activates both sensors and when positioned over a single sensor, activates only the single sensor. A simple algorithm or logic determines position by the rule that, if a single sensor is activated the seat is positioned over the single sensor, but if two sensors are activated, the seat is positioned between those two sensors, and if none of the sensors is activated, the seat is not positioned over any of those sensors.

2 Claims, 5 Drawing Sheets

AIRBAG DEPLOYMENT SYSTEM WITH SEAT POSITION SENSORS

BACKGROUND OF THE INVENTION

The present invention relates to airbags and the sensors used in determining the conditions under which an airbag is deployed.

The deployment of airbags within an automobile to protect the driver or passenger during a crash has continuously become more sophisticated. Multiple airbags or airbags with adjustable inflation parameters have been used in combination with the sensors that determine the presence, the weight, and the position of the occupant opposite an airbag. By knowing the occupant's weight and position, algorithms can be used to tailor the deployment of an airbag either in time or intensity to the particular circumstances of a particular automobile crash and a particular occupant and that occupant's position. Generally, such sensors are designed to increase the overall benefit derived from the presence of an airbag within an automobile. There is thus considerable incentive to add more sensors combined with more complicated deployment algorithms. On the other hand, each additional sensor adds cost and can theoretically increase the cost of maintenance by increasing the number of wires and sensors, which may need to be replaced or maintained.

The manufacturers of automobiles have always been sensitive to the fact that each part, though having only a small cost in itself, when multiplied by sometimes over a million cars of a particular type sold, can constitute a significant total cost. Hence, substantial cost savings can be realized if parts can be eliminated without decreasing functionality.

One area which it has been found desirable to monitor is the position of a seat within an automobile. The seat position gives an indication of the size of the occupant and determines, at least in part, the occupant's position relative to one or more airbags which could be deployed. Thus the position of the seat, whether fully retracted, fully extended, or positioned somewhere in between, is supplied to a controller which uses the information in deciding how and when to deploy one or more airbags. A number of different types of sensors can be used, including those, which supply a continuous varying output depending on seat position, and those which provide discrete output indicating one or more discrete seat locations. The discrete sensors provide the possibility of greater reliability, both because such sensors tend to be inherently reliable, and because the information, which must be transmitted to the airbag deployment logic controller consists of a single logic state. Furthermore, such sensors may often be cheaper than a more sophisticated sensor capable of providing a continuously varying output with seat position.

However, the use of discrete sensors presents the problem that more sensors are needed for more precise determination of seat position. What is needed is a seat positioning system, which reduces cost and increases reliability by reducing the number of discrete sensors without decreasing the precision of seat position determination.

SUMMARY OF THE INVENTION

The seat positioning system of this invention employs a ferromagnetic vane mounted to an automobile seat on the portion of the seat track which moves, and a plurality of sensors spaced along the nonmoving seat track. The ferromagnetic vane is chosen so that it can activate one sensor if positioned over that sensor, or two sensors if it is positioned over two sensors, or three sensors if positioned over three sensors. The physical arrangement of the ferromagnetic vane and the sensors is combined with a logic within the deployment controller which determines the seat position as being either over a particular sensor when one sensor is activated, or between two sensors when both sensors are activated. In this way the number of sensors required for a particular degree of seat position resolution may be reduced. Two sensors can be used to detect four seat positions, three sensors can be used to detect six seat positions, four sensors can be used to detect eight seat positions, etc. In general, the number of seat positions that can be detected is equal to two times the number of sensors. This substantial reduction in the number of sensors required is accomplished by the addition of programming logic to the controller which adds zero incremental cost to an automobile, thus providing a cost savings without a decrease in performance. In an alternative arrangement the sensors are mounted on a moving seat and a ferromagnetic vane is mounted beneath the seat so that the vane operates one or two of the seat mounted sensors at a time.

It is a feature of the present invention to provide automobile vehicle seat positioning information at lower cost.

It is another feature of the present invention to provide an automobile car seat positioning detecting system with reduced cost without reduced performance.

It is a further feature of the present invention to provide an automobile car seat positioning detecting system which substitutes controller logic for sensing hardware.

Further features and advantages of the invention will be apparent from the following detailed description when taken in conjunction with the accompanying drawings.

DETAILED DESCRIPTION OF THE INVENTION

Figure 1:
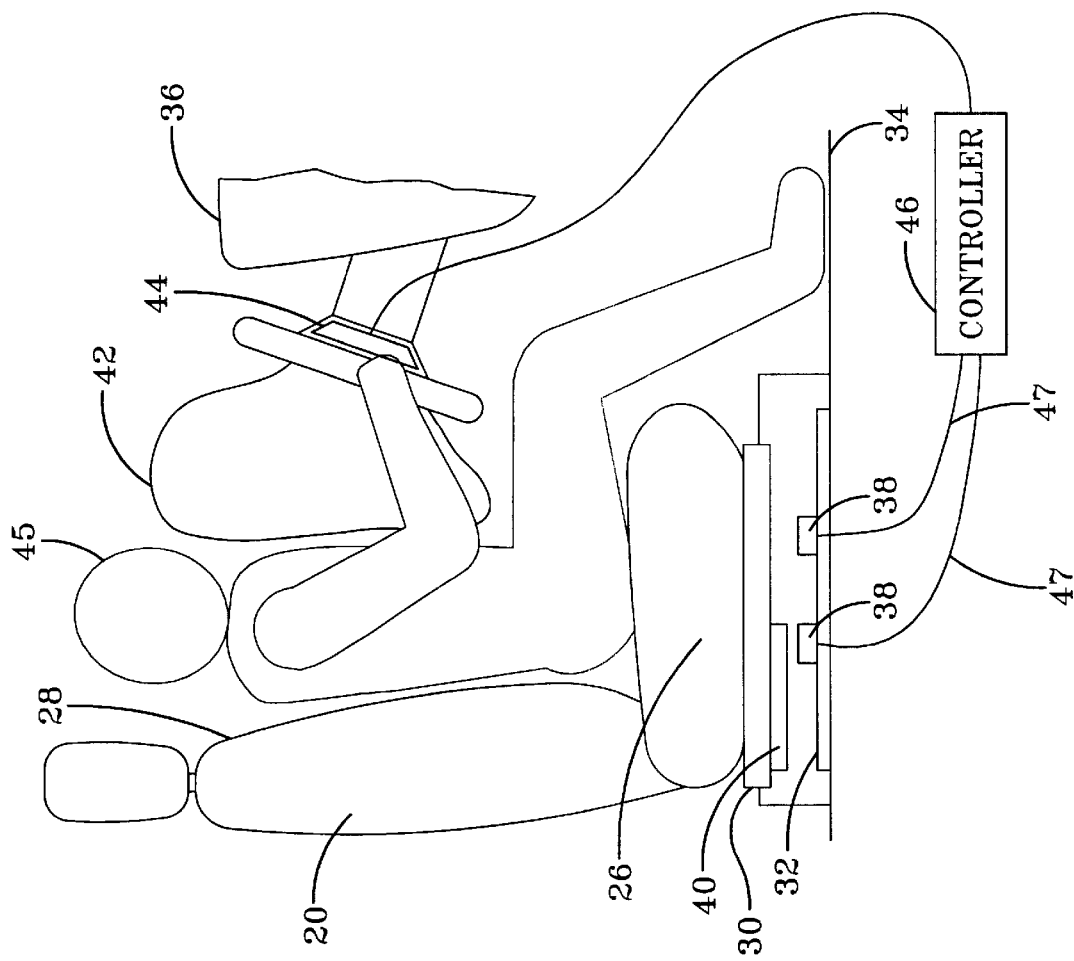
FIG. 1 is a schematic side elevational view of an automobile vehicle seat position information system and airbag deployment system of this invention.

As shown in FIG. 1, a vehicle seat 20 has a seat cushion 26, and a seat back 28, the seat cushion is mounted to an upper seat track 30 which rides on a lower seat track 32 which is mounted to the floor 34 of the vehicle 36. A linear array of sensors 38 is arranged beneath the vehicle seat 20 fixedly mounted to the floor as shown in FIG. 1. The sensors 38 are of the type which are either on or off, such as a reed switch. A means for actuating the sensors 38 such as a ferromagnetic vane 40 is mounted to the upper seat track 30 so that as the seat 20 is positioned with respect to the lower track 32 the means for actuating 40 moves with respect to the sensors 38. The means for actuating 40, is of such a size, or has a range of activation such that when it is positioned directly over a particular sensor 38 only that sensor is activated, but when the means for actuating is positioned over two sensors 38 both sensors are activated.

An airbag 42 is held within an airbag housing 44 and is positioned in front of the vehicle seat 20 so that as the vehicle seat 20 is moved along the lower seat track 32 the vehicle seat 20 moves towards and away from the airbag 42 and the airbag housing 44. More recently developed airbags can have various deployment options so that, for example, the strength of deployment can be varied. These various deployment options are selected based on a deployment logic contained within an airbag or safety system controller 46. The controller receives information from various sensors including crash detecting sensors and sensors which gather information about the presence, weight and placement of an occupant 45 within the vehicle. The controller 46 accords a first value of seat position when a first sensor alone is actuated, a second value of seat position when a second sensor alone is actuated, and a third value of seat position when both the first and second sensors are actuated, with the third value being greater than the second value and less than the first value, and with the third value being equally distant from the first and second values. One input which can be used by the controller 46 as input to deployment logic is the position of the vehicle seat 20 with respect to the undeployed airbag 42 or the airbag housing 44. By knowing the position of the vehicle seat 20, the position of the occupant 45 is constrained, and some information about the size and weight of the occupant may be assumed based on the occupant's positioning of the vehicle seat 20. The use of discrete position sensors such as the sensors 38, which communicate with the controller by wires 47 results in a simple and reliable means of determining seat position.

Figure 2:
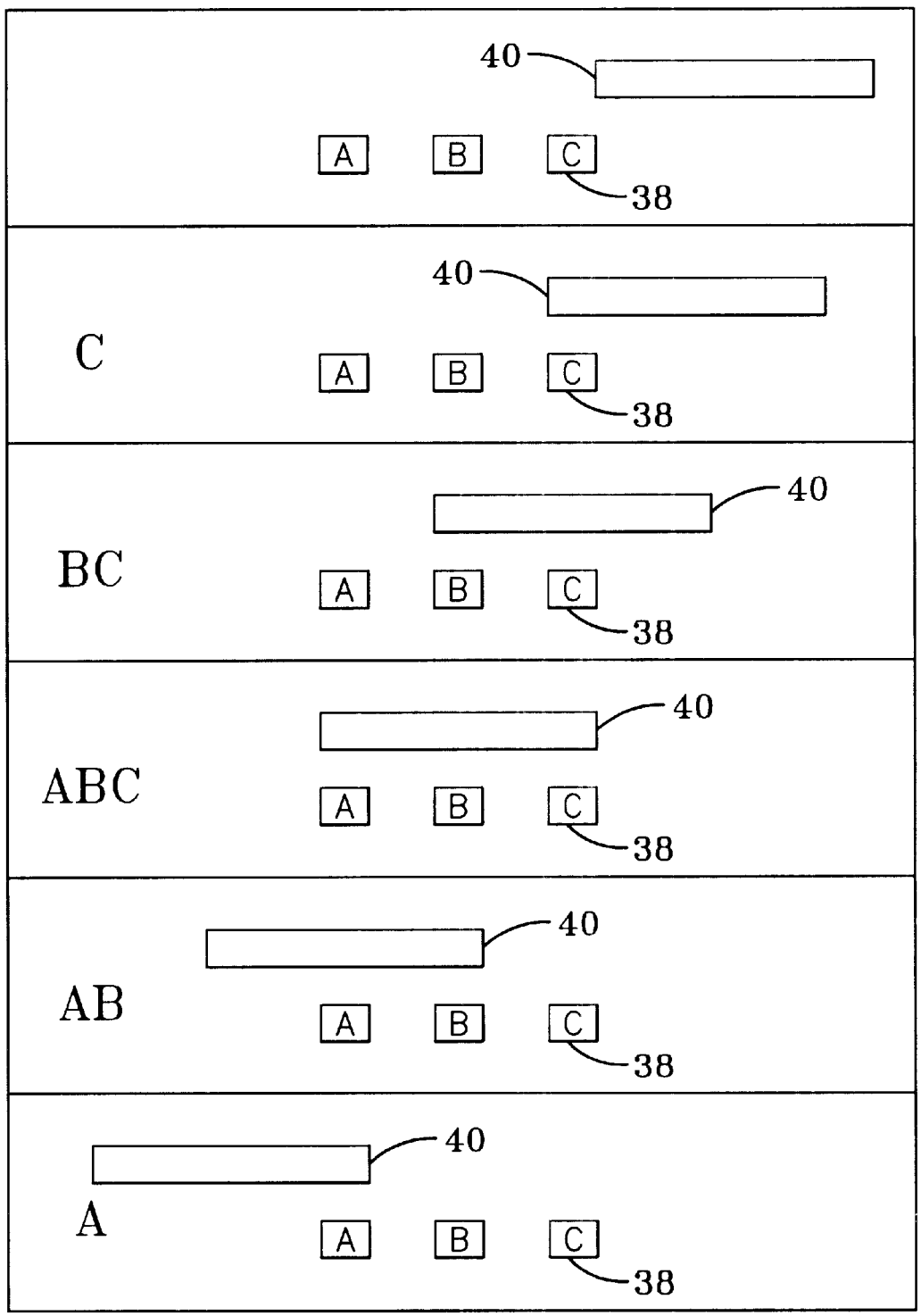
FIG. 2 is a schematic view showing an activation ferromagnetic vane positioned with respect to three sensors to produce six output states.

Referring to FIG. 2, the arrangement of the ferromagnetic vane 40 and three sensors 38, illustrates how a number of sensors S can be used to indicate 2×S different seat positions. Three sensors labeled A, B, and C are arranged in a linear array. Each sensor forms a pair of sensors with one or more adjacent sensors. Thus sensor A is adjacent to and forms a pair with sensor B, sensor A and B is adjacent to sensor C. The means for actuating 40 can be positioned over and actuate a single sensor or a pair of sensors or the three sensors. Thus the three sensors A, B, C, give rise to the following distinct ferromagnetic vane positions and corresponding 6 logic states: A, AB, ABC, BC, C and a None. Thus, for three sensors, there are six logic states or, in general, the number of logic states is equal to twice the number of sensors. The controller 46 simply has a value corresponding to each seat position.

In general, the means for actuating 40 and the sensors 38 should be selected with a sensitivity or range of operation so that the distance moved by the seat 20 is approximately the same for each change from one logic state to another, e.g. the distance from A to AB represents the same distance as between AB and ABC.

Figure 3:
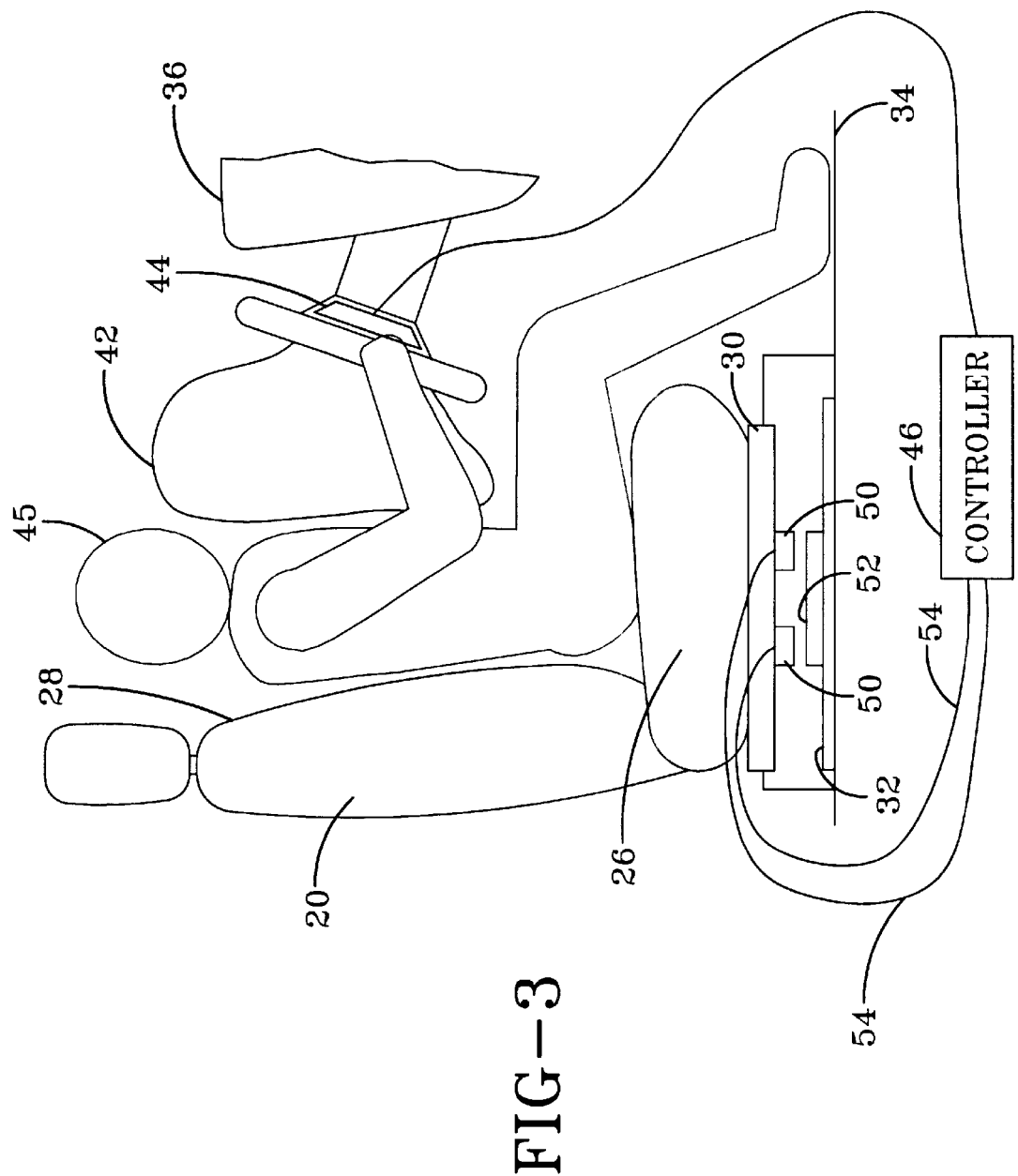
FIG. 3 is a schematic side elevational view of an alternative arrangement of activation means and sensors.

An alternative arrangement for determining the car seat 20 position is shown in FIG. 3. Sensors 50 similar to the sensors 38 may be mounted to the upper seat track 30 so that the sensors 50 moved with the seat 20. An upstanding magnet or flange 52 is mounted to the floor 34. Again the sensors 50 communicate with the controller 46 through wires 54. The arrangement of the flange 52 and two sensors 50, is such that S sensors can be used to indicate 2×S different seat positions. The arrangement shown in FIG. 3 is particularly useful where the sensors are of the type shown in FIGS. 4A, 4B, 4C, and 4D. A reed switch 56 is spaced from a magnet 58 on a sensor bracket 62 across a gap 64. The downwardly opening gap 64 is less subject to becoming filled with debris or dirt which could interfere with the operation of the sensors, which react to a upstanding flange or ferromagnetic vane 66 mounted to a bracket 68 which is mounted to the lower seat track 32 or the floor 34 of the vehicle 36. Examples of this type of sensors and ferromagnetic vanes are shown in U.S. Pat. No. RE 37,466, which is incorporated herein by reference.

Figure 4A:
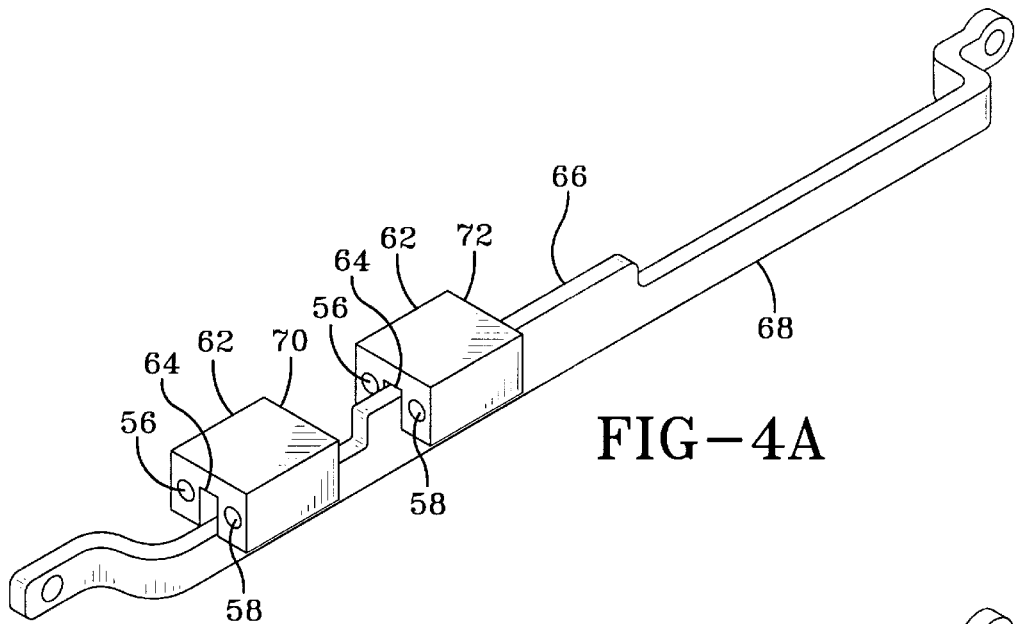
FIG. 4A is an isometric view of a further embodiment seat position sensor with the sensors in a first position.
Figure 4B:
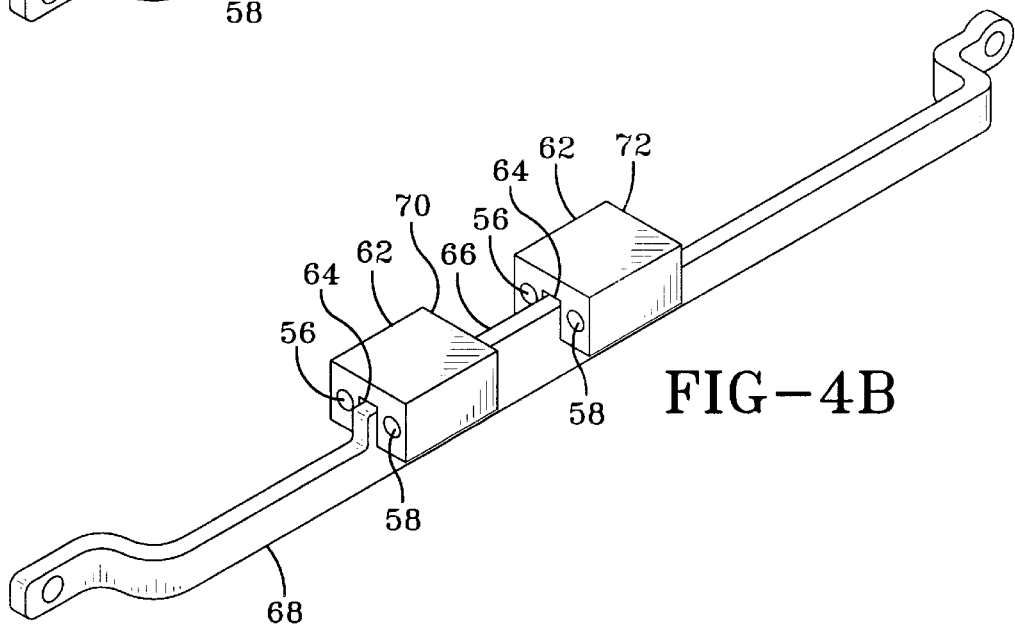
FIG. 4B is an isometric view of a further embodiment seat position sensor with the sensors in a second position.
Figure 4C:
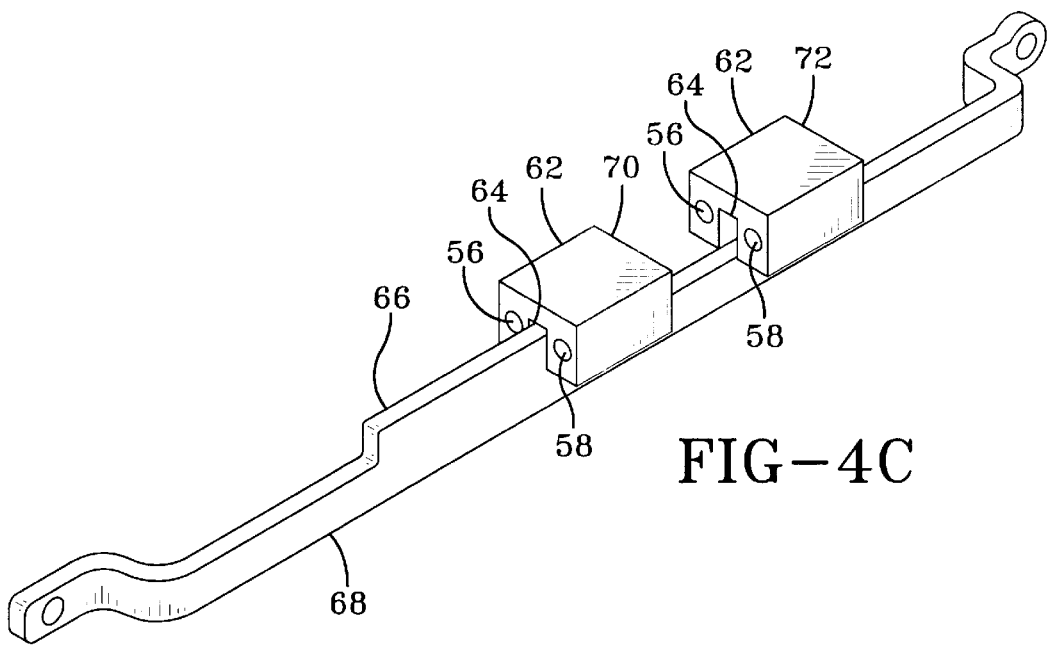
FIG. 4C is an isometric view of a further embodiment seat position sensor with the sensors in a third position.
Figure 4D:
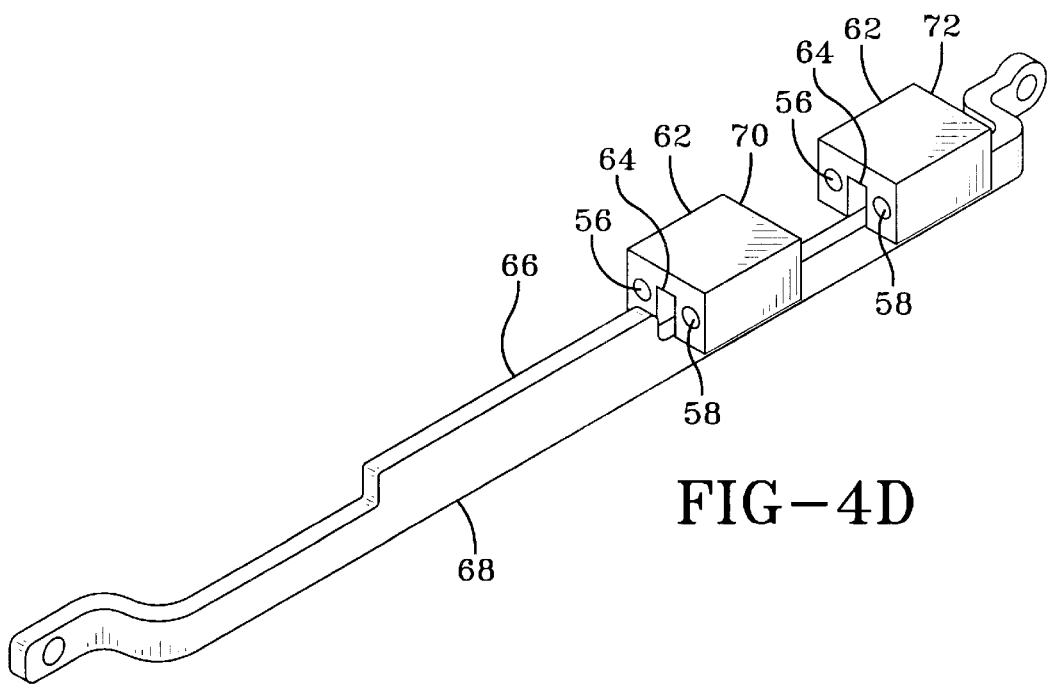
FIG. 4D is an isometric view of a further embodiment seat position sensor with the sensors in a fourth position.

Referring to FIGS. 4A–4D, the arrangement of the sensor brackets 62 illustrates how two sensors can be used to indicate 2×2 or four different seat positions. In FIG. 4A the ferromagnetic vane 66 engages only the first sensor bracket 72, in FIG. 4B the ferromagnetic vane 66 engages the first sensor bracket 72 and a second sensor bracket 70, in FIG. 4C the ferromagnetic vane 66 engages only the second sensor bracket 70. In FIG. 4D the ferromagnetic vane 66 does not engage both sensor brackets 70 and 72.

It should be understood that sensors other than reed switches could be used, for example mechanical switches or optical switches, and that the means for activation could be a magnet, or a mechanical arm for activating one or two switches at a time, or a flange for blocking light so as to operate one optical switch or a pair of optical switches, or a magnetic shunt which comes between a fixed magnet and magnetic sensor such as a Hall affect sensor, a reed switch or a GMR sensor. It will of course be understood that each seat detection position corresponding to a logic state, will actually correspond to a range of positions, so that the actual position of the seat for a particular logic state is within a range of distances from the airbag housing 44 or other selected reference point.

It is understood that the invention is not limited to the particular construction and arrangement of parts herein illustrated and described, but embraces all such modified forms thereof as come within the scope of the following claims.

We claim:

1. An airbag deployment system comprising:
an airbag within an airbag housing, mounted to a vehicle;
a seat within the vehicle, the vehicle seat spaced from the airbag and mounted to be selectively positionable on the vehicle and with respect to the airbag;
an actuator mounted on one of the seat and the vehicle;
a first sensor and a second sensor mounted to the other one of said vehicle seat and the vehicle and positioned to be activated by the actuator; and
a third sensor mounted with the first sensor and the second sensor in a linear array and positioned to be activated by the actuator, the vehicle seat having a first position wherein the first sensor alone is actuated by the actuator, a second position wherein the first and the second sensors are activated by the actuator, a third position wherein the three sensors are activated, a fourth position wherein the second and third sensors are activated, a fifth position wherein only the third sensor is activated, and a sixth position wherein none of the sensors is activated, the third position being between the first position and the fifth position.

2. An airbag deployment system comprising:
an airbag within an airbag housing;
a vehicle seat spaced from the airbag housing and mounted to be selectively positionable with respect to the airbag housing;

a means for actuating mounted on a vehicle and fixed with respect to the airbag housing;

a first sensor and a second sensor mounted on the vehicle seat for motion with the vehicle seat, and positioned to be activated by the means for actuating; and a third sensor mounted on the vehicle seat for motion with the vehicle seat and positioned to be activated by the means for actuating, the vehicle seat having a first position wherein the first sensor alone is actuated by the means for actuating, a second position wherein the first and the second sensors are activated by the means for actuating, a third position wherein the three sensors are activated, a fourth position wherein the second and third sensors are activated, a fifth position wherein only the third sensor is activated, and a sixth position wherein none of the sensors is activated, the third position being between the first position and the fifth position.

* * * * *